(12) United States Patent
Graham et al.

(10) Patent No.: US 7,040,151 B2
(45) Date of Patent: May 9, 2006

(54) BRAKE EVALUATION GAUGE

(76) Inventors: Myron Roy Graham, 7414 River Ridge Dr., Chattanooga, TN (US) 37416; Michelle Anne Graham, 7414 River Ridge Dr., Chattanooga, TN (US) 37416

( * ) Notice: Subject to any disclaimer, the term of this patent is extended or adjusted under 35 U.S.C. 154(b) by 0 days.

(21) Appl. No.: 11/047,153

(22) Filed: Jan. 31, 2005

(65) Prior Publication Data

US 2005/0274175 A1 Dec. 15, 2005

Related U.S. Application Data

(60) Provisional application No. 60/571,203, filed on May 14, 2004.

(51) Int. Cl.
*G01L 5/28* (2006.01)
(52) U.S. Cl. ............... 73/121; 73/128; 73/129; 33/600; 33/609; 33/610
(58) Field of Classification Search ............... 73/121, 73/128, 129; 33/600, 609, 610
See application file for complete search history.

(56) References Cited

U.S. PATENT DOCUMENTS 450,065 A * 4/1891 Fontaine ............... 33/704
D229,222 S * 11/1973 Paulk ............... D10/64

* cited by examiner

*Primary Examiner*—Edward Lefkowitz
*Assistant Examiner*—Freddie Kirkland, III
(74) *Attorney, Agent, or Firm*—Stephen J. Stark; Miller & Martin PLLC

(57) ABSTRACT

A brake evaluation gauge is useful to determine a brake lining thickness and/or brake drum wear. Depending on the particular embodiment selected, one of a thickness measurement, a percentage of brake life left, a pass or a fail indication may be indicated for the thickness of the brake lining. A first end of a gauge is inserted between a brake shoe table and a brake drum of applied air brakes to provide this reading. Furthermore, a recess in the gauge is placed over a ridge created by wear of the brake lining on the brake drum. If the ridge contacts the interior surface of the recess, then excessive wear of the brake drum is indicated.

17 Claims, 3 Drawing Sheets

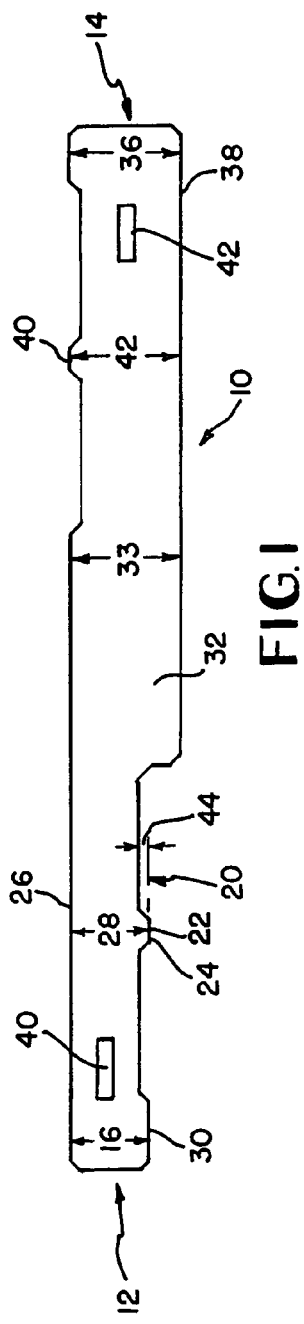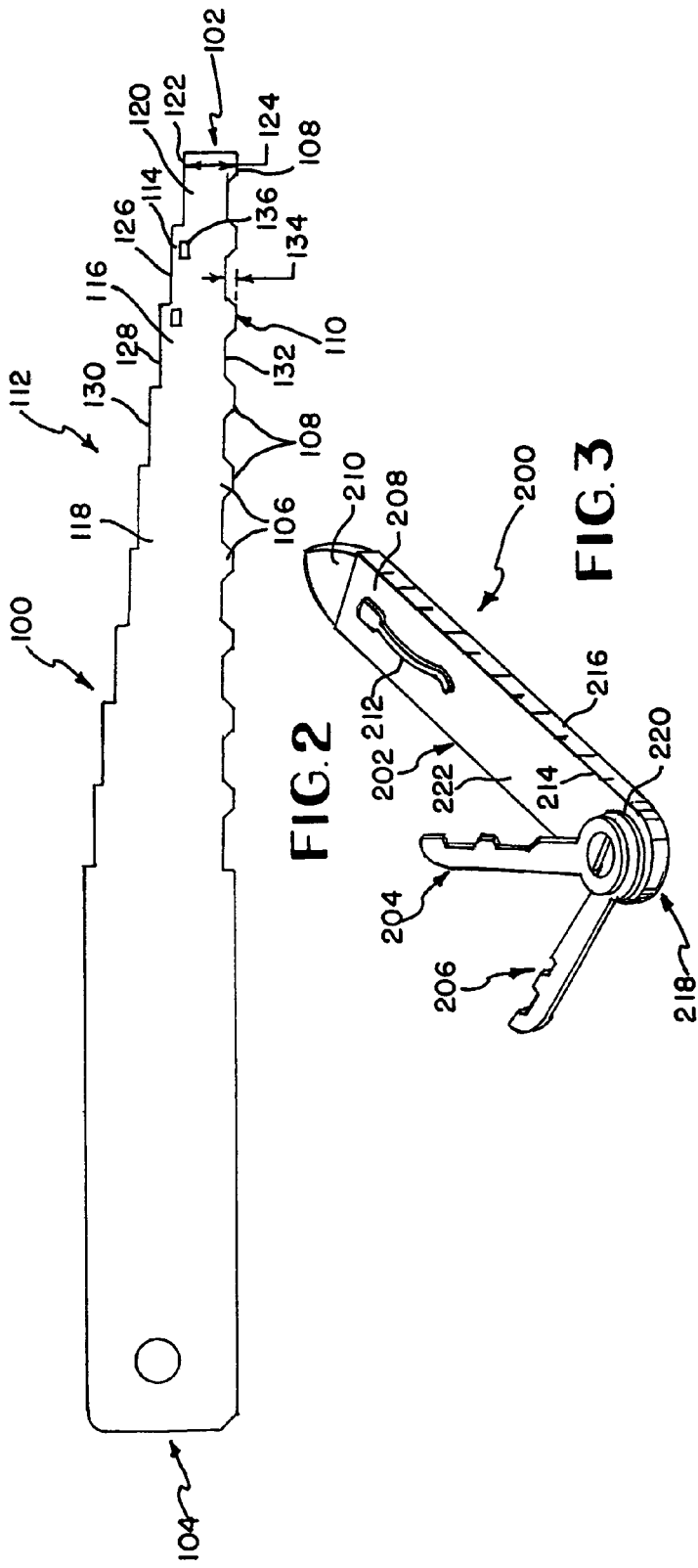

BRAKE EVALUATION GAUGE

CLAIM OF PRIORITY

This application claims the benefit of U.S. Provisional Patent Application No. 60/571,203 filed May 14, 2004.

FIELD OF THE INVENTION

The present invention relates to tools that allow a technician to quickly and safely check the brake lining thickness on drum style air brake vehicles, and more particularly, to a gauge that is inserted between the drum and brake shoe table to measure the brake lining thickness.

DESCRIPTION OF RELATED ART

The traditional method of determining how much brake lining is left or to determine if a brake drum is worn out from wear relies upon technicians operating per a maintenance schedule. The technician determines the amount of time since the last brake check, disassembles the drum relative to the brake lining, and evaluates the wear with the parts disassembled. Many times, a technician would rather go ahead and replace the brake shoe linings or brake drum because this is a convenient time to do the repair whether or not some usable life remained on these parts.

With the brake shoe lining removed from the brake shoe table, and with the brake drum removed from the brake system, a micrometer can be utilized to check the thickness of the brake shoe lining as well as the wear on the brake drum. This is not an efficient use of time since significant time and effort is expended into removing and/or disassembling the brake system to remove these components from the vehicle.

Brake lining gauges are available on the market which are constructed somewhat akin to a pair of pliers. These devices grab the thickness of the brake lining on one end while the other end of the scissors type mechanism has a ruler structure which provides a reading relative to the thickness of the grabbed lining. The problem with this device is the brake lining must be removed from the vehicle for measurement.

Accordingly, a need exists for a tool which can be utilized to check the remaining life of brake shoe lining, drum wear and even brake stroke in some embodiments.

SUMMARY OF THE INVENTION

It is an object of the present invention to provide a gauge which can quickly and easily be utilized to check the brake lining thickness on drum style air brake vehicles.

It is another object of the present invention to provide at least in one embodiment of a gauge which informs the user as to whether or not at least one of the brake linings and brake drums meet a minimum threshold of continued serviceability.

It is another object of the present invention to provide a tool having both a minimum lining test gauge as well as the necessary components to quickly and easily measure brake stroke at least in some embodiments.

Accordingly, a brake gauge of the presently preferred embodiment provides a top surface which can be held against the brake shoe table with the brakes are applied. In the preferred embodiment the top surface or back is continuous or planar although in alternative embodiments a top plane is defined although notches intermediate peaks which form the top plane can be provided. With this top surface on the brake table, the gauge is then pushed in from the outside of the brake toward the inside of the brake and if the tool slides in easily, the brakes do not need to be changed if the minimum depth is found with the gauge. Since the minimum depth is a predetermined amount, the thickness between the top and bottom can be provided on the gauge.

In some embodiments, the gauge may be provided which informs the user that a certain percentage, a specific depth or plurality of percentages and depths remain available (or have been worn off).

Additionally, the gauge preferably includes at least one relief area for checking wear on brake drums. The relief is placed against the outside of the drum which is not contacted by the brake lining. If the relief touches the lip of the brake drum with the gauge parallel to the brake shoe table, then excessive where it has occurred on the brake drum. Reliefs may be made on the top or the bottom of the gauge depending on a particular selected embodiment.

Furthermore, to keep the gauge from rocking about during this test, it has been found helpful to provide at least one foot within the relief area so that the portion of the brake drum that is worn may be contacted with a foot as well as the end of the tool to assist the operator in holding the gauge parallel to the brake shoe table. The tool may be constructed in various embodiments. A first embodiment may be designed to quickly advise one as to whether the brake linings do not meet the minimum requirements immediately, or whether or not there is more or less than 50% remaining, etc. This embodiment provides a go/no go type indication. Each end of the tool may be equipped with a predetermined measurement, such as one side the minimum and the other side 50% life remaining. In another embodiment, a series of graduations inform either of a specific measurement or a percent remaining as one of several predetermined selected selections. Finally, a third embodiment includes a gauge having at least one end of the first embodiment to provide a single measurement as to whether or not there is a minimum amount of brake lining remaining. The gauge is connected to a soapstone holder equipped with a ruler and a soapstone for easily measuring the brake stroke. Furthermore, it will be obvious that any of the above embodiments can be combined together or with other features to provide a single tool or tools for use by technicians, mechanics, drivers, etc., who check brakes.

BRIEF DESCRIPTION OF THE DRAWINGS

The particular features and advantages of the invention as well as other objects will become apparent from the following description taken in connection with the accompanying drawings in which:

FIG. 1 is a side plan view of a first presently preferred embodiment of the present invention of a brake gauge of the first preferred embodiment;

FIG. 2 is a side plan view of a brake gauge of a second preferred embodiment;

FIG. 3 is a top perspective view of a brake gauge of a second alternatively preferred embodiment;

DETAILED DESCRIPTION OF THE DRAWINGS

Figure 4:
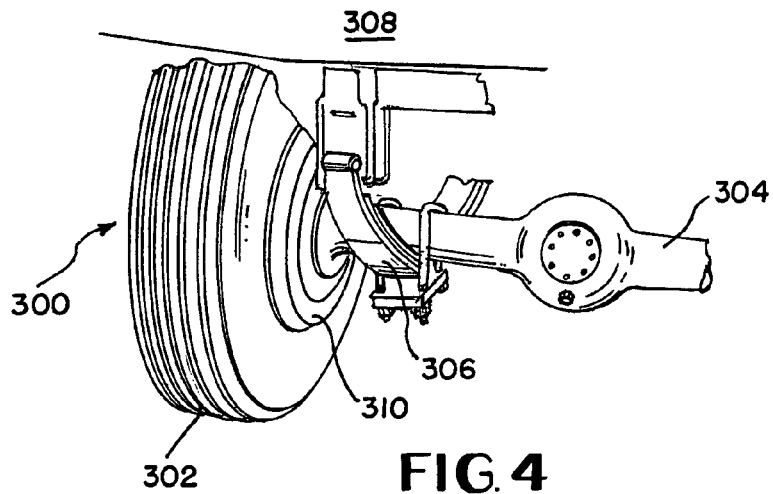
FIG. 4 is a perspective view of an underside of a vehicle showing air brakes connected to a wheel.

FIG. 1 shows a presently preferred embodiment of the present invention, namely, a brake gauge 10 is shown having a first end 12 and a second end 14. This is the first preferred embodiment. In this embodiment, both the first and second ends 12,14 are utilized in the same manner, but report different indications to the user. The first end 12 is the change end. The gauge 10 has a predetermined distance 16 at the first end 12. If at least the distance 16 remains between the brake shoe table and brake drum with the brakes applied, then at least the minimum required amount of brake lining remains.

Recesses 18 and 20 are located opposite leg 22. Leg 22 has a bottom foot 24. As illustrated in FIG. 1, the gauge 10 at the first end 12 has a back 26. The foot 24 extends a distance 28 from the back 26. Similarly, a toe 30 closer towards the first end 12 then the foot 24 extends the first predetermined distance 16 from the back 26. In the preferred embodiment, the first predetermined distance 16 and the second predetermined distance 28 are equivalent to one another. The function of this feature will be described in more detail below. Recess 20 terminates at shank portion 32 which is useful along with the second end 14 to grip the gauge 10 while utilizing the first end 12. The shank 32 has a width 33 longer than the second predetermined distance 28.

One skilled in the art will observe that the second end 14 is somewhat similar to the first end 12. One difference between ends 12,14 is that second toe 34 extends a third predetermined distance 36 from back 38 and foot 40 extends a fourth predetermined distance from second back 38. While the third and the fourth predetermined distances 36,40 are the same as illustrated in this embodiment, the third and the fourth predetermined distances 36,40 are greater than the first and second predetermined distances 16,28 in this embodiment. When utilizing the second end 14, more than the minimum, such as a 50% of remaining brake lining can be evaluated by the technician as will be described with reference to the figures below. Accordingly, the gauge 10 of a presently preferred embodiment can be utilized by the operator to evaluate when the minimum amount of lining is not present so that the brake linings can be changed when using first end 12 as well as when more or less than 50% of the brake linings are remaining when utilizing the second end 14.

The preferred embodiment is formed of 302 stainless steel and is approximately ⅛ of an inch thick although other dimensions and materials could also be utilized as will be understood to one skilled in the art.

FIG. 2 is a second preferred embodiment of a gauge 100. This gauge has a first end 102 and a handle end 104. In this embodiment, only the first end 102 is utilized as the tool end while the operator holds the handle somewhere closer to the handle end 104. In this embodiment, a plurality of legs 106 having feet 108 extend from a front 110 of the gauge 100. From the back 112 of the gauge 100 a plurality of steps 114,116,118,120 etc. The first step 120 is useful to set so that the distance from the first foot 108 to the back 122 of the first step 120 is a predetermined distance 124 which corresponds to the minimum allowable amount of brake lining left. From there, the remaining steps, namely 114,116,118, etc., are useful to incrementally or otherwise provide a percentage or an amount of brake lining material remaining based upon the distance from the respective back such as 126,128,130 etc., to the plane of the feet 108. Reference to FIG. 2 will be incorporated with a description of FIG. 8 to describe this embodiment and use below.

FIG. 3 shows a second alternatively preferred embodiment tool 200 has a brake stroke test device 202, a first gauge 204 and a second gauge 206. Of course, in other embodiments it is possible to have only a single brake test gauge 204 or 206 or even additional brake test gauges. The brake stroke test apparatus 202 is preferably equipped with a marker such as a soapstone holder 208 which retains a soapstone 210. A clip 212 is useful to retain the tool 200 in the pocket of the mechanic. Along one edge 214 is preferably provided with a ruler 216 that begins at an end 218 of the tool 200. The first and second brake gauges 204,206 are illustrated configured identical to the first and second ends 12 and 14 of the first preferred embodiment of the brake gauge 10. The primary difference being that each of the gauges 204,206 has a pivot located where retainer 220 passes through a bore (not shown) and ends of the first and second gauges 204,206. This allows the gauges 204,206 to pivot relative to the body 222 of the brake stroke test apparatus 202 not aligned with the body 222 so they can be utilized as will be described below while also able to pivot into alignment for storage. This apparatus has been designed with the roadside vehicle inspector in mind. This tool 200 allows for the inspector to quickly and easily measure the brake stroke as well as whether or not there is sufficient brake lining or brake drum to meet the minimum required by the law.

Illustrations of the underside of the vehicle 300 such as those shown in FIG. 4 are useful to show how the present invention works in operation. One skilled in the art will understand that tire 302 is connected to an axle 304 at a wheel. Springs 306 support the underside 308 of the vehicle 300 above the axle 304. Brake drum 310 is illustrated on the interior side of the vehicle 300.

Figure 5:
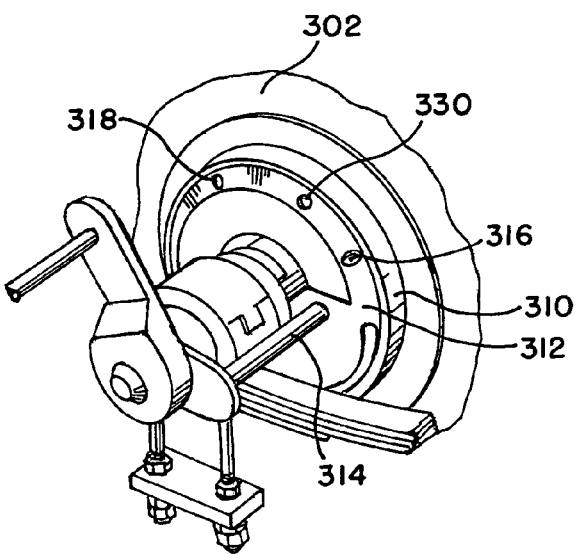
FIG. 5 is a view of the brake assembly as a wheel showing the dust cover relative to the brake drum.

FIG. 5 shows another view of the brake drum 310 with dust shield 312 and the activation rod 314 for which causes the brakes to stop the tire 302 from rotating. One skilled in the art would understand the operation of air disc brakes. The dust cover 312 is often provided with one or more inspection slots 316,318 however, in some instances the slots 316 and 318 are not oriented for proper use with the gauges 10,100,204,206 of the presently preferred embodiments. Specifically, the dust cover 312 needs at least one of the slots 316,318 to be aligned with the gap 320 shown in FIG. 6 between adjacent brake linings 322,324.

The two brake linings 322,324 rest on a brake table 326. This brake table 326 moves radially outwardly to apply brakes. The brakes are shown applied in FIG. 6 where the linings 322,324 are pressed by the brake table 326 against the interior of the drum 328. When the brakes are released, the brake table 326 moves radially inwardly pulling the linings 322,324 radially inwardly so that a gap is created between the brake linings 322,324 and the brake drum 328. This allows the wheel and tire 302 to turn. However, since it is the thickness of the brake linings 322,324 that measurement is desired, the easiest way to measure this thickness with the gauges 10,110,204,206 is to apply the brakes and then insert the various gauges which will be described below with reference to FIGS. 7–10 to measure the thickness and also measure the brake drum wear as will be described below.

Figure 6:
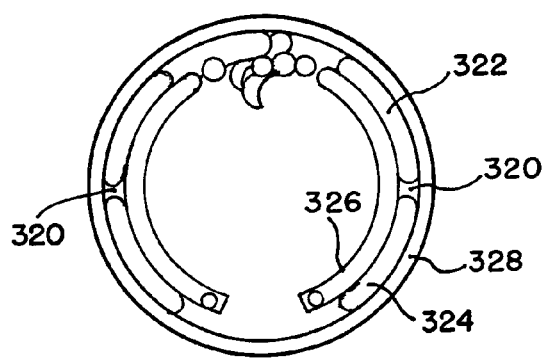
FIG. 6 is an internal schematic view of the inner workings of the brake shoe linings relative to the brake drum.

When the slots 316,318 of the dust cover 312 do not align with any of the gaps 320 between the brake linings 322,324 then a hole such as ⅞" hole or other configuration may be drilled through the dust cover at the location of at least one of the gaps 320 (i.e., there are almost always two linings 322,324 with gap 320 in between as shown in FIG. 6, but there can also be other gap locations) at this location so that the tool may be inserted through drilled hole 330 if preferred or useful.

Figure 7:
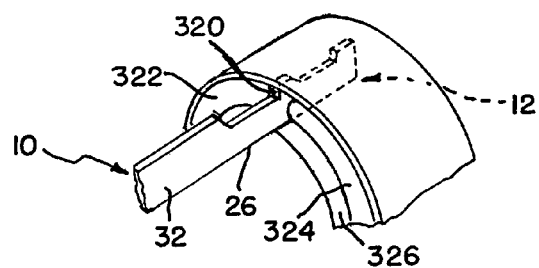
FIG. 7 is a perspective view of showing the presently preferred embodiment testing the lining thickness in accordance with the present invention.

FIG. 7 shows the gauge 10 of FIG. 1 in operation. The dust cover 312 would normally still be installed as shown in FIG. 5 but has been removed from this view so that the shank portion 32 is shown (i.e., only one of the ends, in this case end 12, is shown inserted through one of the slots 316,318 or hole 330 through the dust cover and into the gap 320 between the linings 324,326 with the brakes applied. The back 26 is shown resting against the exterior surface of the shoe table 326 along at least a portion of its length. Although it is also possible that the dust cover 312 may be removed or other openings may be provided in the dust cover 312 to allow actions to at least one of the gaps 320 between the brake linings 322,324.

If the gauge 10 or 100 will slide easily in and out of the gap 320, then the respective first, second, or other predetermined distances 16,28, 124, etc., are exceeded by the thicknesses of the brake linings 322,324. If the tool sticks or will not slide into the gap 320, then the thicknesses of at least one of the linings 322,324 is less than the first and second predetermined distances 16,28 thereby indicating a condition of the brake linings. Specifically, the first end 12,102 is utilized to indicate the minimum allowable thickness of the brake pad linings 322,324 thereby indicating that the brakes should be disassembled and the brake linings changed. The exact same process is applicable to the second end 14 of the gauge 10 except that if the brake lining thicknesses 322,324 exceed the third and fourth predetermined distances 36,42, then in the preferred embodiment more than 50% of the brake lining life is left while if the tool sticks and will not slide easily in the gap 320, then less than 50% of the remaining lining is indicated.

It is quite possible that less than 50% of the remaining life could be left while the brake linings 322,324 still do not need to be changed at a predetermined time. In the preferred embodiment, the second predetermined distance is ⅜" while the third and fourth predetermined distance is ½" as is utilized by the standards for most brake linings for a standard width brake lining. Indicia 40,42 is useful toward the ends 12,14 of the gauge 10 to indicate the thickness being measured to the user.

Although a "50%" and a "change" predetermined distance are provided in the preferred embodiment as indicia 40,42, it is also possible that one end 12 could be utilized as a change indicia or a go or no go thickness for standard width brakes while a second end 12 could have different predetermined go or no go distance for a wide width brake.

In addition to checking the brake lining thickness with the gauge 10, the gauge 10 also provides an ability to check the wear on a brake drum which will be described in reference to FIGS. 9 and 10. Also shown in phantom is the first alternatively preferred gauge 100 of FIG. 2. It will be understood to one skilled in the art that the gauges 204,206 are similarly constructed except possibly having different dimensions as the ends 12,14 of the gauge 10 of FIG. 1.

Figure 9:
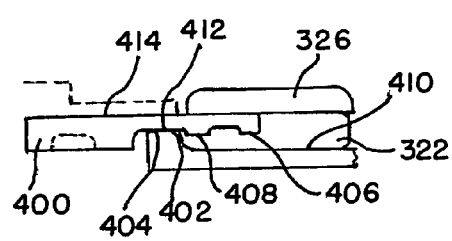
FIGS. 9–10 are cross sectional views showing the embodiments testing the wear of the brake drum showing unsatisfactory wear in FIG. 9 and satisfactory wear in FIG. 10.
Figure 10:
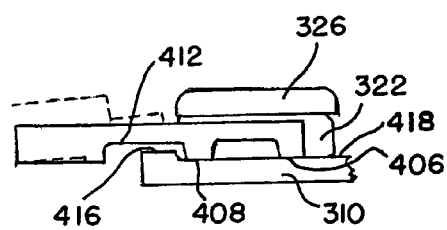

FIG. 9 shows end shows gauge portion 400 which could be any of first end 12, second end 14, tool end 102 or first and second gauges 204,206 being inserted into the gap from the cross-sectional side view. Instead of pushing the back 26 against the shoe table 326 as is shown in FIG. 7, one of the recesses in this case, recess 402 is placed against the lip, if it exists on the brake drum 310. The brake drum 310 starts out as having a continuous planar cylindrical interior surface which would be represented by this cross-sectional view as a linear interior surface. However, wear by the lining inside the drum 310 normally creates a ridge 404 at the interior portion of the brake drum 310. This ridge 404 is placed against the recess 402 of the appropriate tool. If the toe 406 or the foot 408 contact the interior surface of the brake drum 410 without the interior surface 412 defined by the recess 402 not contacting the ridge 404 as shown in FIG. 10, then the brake drum 310 still has usable life left on it. The tool such as gauge 10 is parallel to the shoe table 326 during this step. The back 414 is maintained parallel to the shoe table 326.

In FIG. 9, an unacceptable level of wear has been discovered because the distance between the innermost surface 412 and the foot 400 and the toe 406 is represented by a predetermined distance 44 in FIG. 1 is exceeded by the height of the ridge 404 relative to the brake drum surface 410 where it contacts the lining 322, indication exists showing that excessive wear has occurred to the brake drum 310. When using the alternatively preferred embodiment of FIGS. 2 and 8, the feet 108 are utilized in a similar manner adjacent with the ridge 404. The ridge 404 extends between adjacent feet 108 intermediate interior surface with the interior surface 132 either spanning the ridge 404 or contacting the ridge 404 thereby preventing at least one of the feet 108 from contacting the interior surface 410 of the brake drum 310 as shown in FIG. 9. Once again, this is an unsatisfactory wear on a brake drum 310.

The predetermined distance 44 or 134 is half the amount required by law for the change in diameter of the brake drum since this gauge measures a change to the radius. The change of radius thus must be multiplied by two to obtain the change in diameter. FIG. 10 shows an acceptable amount of wear for a ridge 416. Ridge 416 is still perceivable relative to the interior surface 418 of the brake drum 310, but the feet 406,408 are located against the interior surface 418 while the interior surface 412 does not contact the ridge 416.

Figure 8:
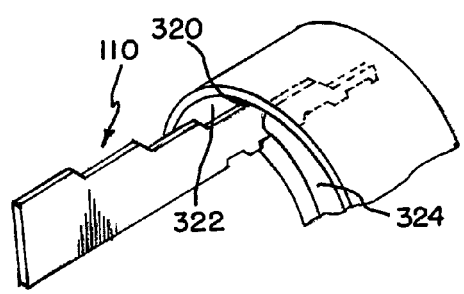
FIG. 8 is a perspective view of the first preferred embodiment testing the thickness of a lining in the course of the present invention.

FIG. 8 shows a second preferred embodiment of the gauge 110 utilized to measure the thickness of the remaining brake drum linings. Specifically, the tool end 102 is inserted into the gap 320 with the feet 108 adjacent the shoe table 326 as far as it can be inserted. Where the gauge stops the user is apprised with indicia such as indicia 136,138 shown in FIG. 2 advising the user of either the percentage of brake remaining and/or the specific thickness of the brake lining 322,324 remaining.

Although several embodiments are shown in the various drawings, other embodiments will be obvious based on these teachings to one skilled in the art to create still further embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

The invention claimed is:

1. A method of utilizing a measurement gauge for use with brakes comprising:

providing a gauge having a shank connected to a first end, said first end having a toe extending a first predetermined distance from a back, a recess intermediate the first end and the shank, said recess having an interior surface spaced from the toe by a predetermined-recess distance;

applying brakes on a vehicle having a brake shoe table connected to at least one brake lining which act on a brake drum;

measuring brake lining wear by inserting the first end with one of the back of the gauge against the brake shoe table with the brakes applied and inserting the toe of the gauge against the brake shoe table with the brakes applied, and if the gauge passes between the brake shoe table and the brake drum along the width of the at least one brake lining, indicating to the user of the gauge that at least the first predetermined distance exists as a thickness of the at least one brake lining, and if the gauge sticks or does not pass between the brake shoe table and the brake drum along the width of the at least one brake lining, indicating to the user of the gauge that the first predetermined distance does not exist as a thickness of the at least one brake lining; and measuring brake drum wear by performing the steps of inserting the recess over a ridge of the brake drum; and with the toe contacting the brake drum where the lining contacts the brake drum when the brakes are applied, examining to see if the interior surface of the recess contacts the ridge, if the ridge contacts the interior surface then indicating that brake drum wear exceeds a maximum allowable wear, but if the ridge does not contact the interior surface of the recess, then indicating that brake drum wear does not exceed the maximum allowable wear.

2. The method of claim 1 further comprising a foot intermediate the toe and the shank toward the first end, said foot spaced by the recess from the toe, said foot extending a second predetermined distance from the back, and further comprising the step of contacting the foot against one of the brake shoe table and the brake drum during the step of measuring break lining wear.

3. The method of claim 2 wherein the first and second predetermined distances are equivalent.

4. The method of claim 1 wherein the predetermined recess distance is one half the maximum allowable wear for a measured brake drum.

5. The method of claim 1 wherein the gauge further comprises a second end, said second end connected to the first end through the shank, said second end having a toe extending a third predetermined distance from a back, a recess intermediate the second end and the shank, said recess having an interior surface spaced from the toe by a predetermined recess distance;

applying brakes on the vehicle; and measuring brake lining wear by inserting the second end with one of the back of the gauge against the brake shoe table with the brakes applied and inserting the toe of the gauge against the brake shoe table with the brakes applied, and if the gauge passes between the brake shoe table and the brake drum along the width of the at least one brake lining, indicating to the user of the gauge that at least the third predetermined distance exists as a thickness of the at least one brake lining, and if the gauge sticks or does not pass between the brake shoe table and the brake drum along the width of the at least one brake lining, indicating to the user of the gauge that the third predetermined distance does not exist as a thickness of the at least one brake lining.

6. The method of claim 5 wherein the second end further comprising a foot intermediate the toe and the shank toward the second end, said foot spaced by the recess from the toe, said foot extending a fourth predetermined distance from the back, and further comprising the step of one of contacting the foot against one of the brake drum and the brake shoe table with the first end during the step of measuring brake lining wear and contacting the foot against the brake drum during the step of measuring brake drum wear.

7. The method of claim 5 wherein the third and fourth distances are equivalent.

8. The method of claim 5 further comprising the step of providing indicia on at least one of the first and second ends thereby providing an indication relative to one of the first and third predetermined distances.

9. A method of utilizing a measurement gauge for use with brakes comprising;

providing a gauge having a shank connected to a first end, said first end having a toe extending a first predetermined distance from a back, a recess intermediate the first end and the shank, said recess having an interior surface spaced from the toe by a predetermined recess distance;

applying brakes on a vehicle having a brake shoe table connected to at least one brake lining which act on a brake drum;

measuring brake lining wear by inserting the first end with one of the back of the gauge against the brake shoe table with the brakes applied and inserting the toe of the gauge against the brake shoe table with the brakes applied, and if the gauge passes between the brake shoe table and the brake drum along the width of the at least one brake lining, indicating to the user of the gauge that at least the first predetermined distance exists as a thickness of the at least one brake lining, and if the gauge sticks or does not pass between the brake shoe table and the brake drum along the width of the at least one brake lining, indicating to the user of the gauge that the first predetermined distance does not exist as a thickness of the at least one brake lining; and a brake stroke tool connected to the gauge, said brake stroke tool having a ruler and a marker, and further comprising the step of measuring brake stroke with the brake stroke tool.

10. The method of claim 9 wherein the marker further comprises a soapstone holder connected to a soapstone, and the soapstone is utilized to mark a portion of the vehicle for the step of measuring brake stroke.

11. The method of claim 9 wherein the brake stroke tool is connected to the gauge at a pivot, said pivot located at the shank of the gauge, and during the step of measuring brake lining thickness, pivoting the gauge out of adjacent collinear alignment with the ruler of the brake stroke tool.

12. A method for measuring brake drum wear comprising the steps of:

providing a gauge having a shank connected to a first end, said first end having a toe extending a first predetermined distance from a back, a recess intermediate the first end and the shank, said recess having an interior surface spaced from the toe by a predetermined recess distance;

providing a vehicle having a brake shoe table connected to at least one brake lining which act on a brake drum; and inserting the recess over a ridge of the brake drum; and with the first end contacting the brake drum, examining to see if the interior surface of the recess contacts the ridge, if the ridge contacts the interior surface then indicating that brake drum wear exceeds a maximum allowable wear, but if the ridge does not contact the interior surface of the recess, then indicating that brake drum wear does not exceed the maximum allowable wear.

13. The method of claim 12 wherein the first end further comprises a foot intermediate the toe and the shank toward the first end, said foot spaced by the recess from the toe, said foot extending a second predetermined distance from the back, and further comprising the step of contacting the foot against the brake drum during the step of measuring break drum wear.

14. The method of claim 13 wherein the second predetermined distance is at least substantially equal to the first predetermined distance.

15. A method of utilizing a measurement gauge for use with brakes comprising:

providing a gauge having a shank connected to a first end, said first end having a toe extending a first predetermined distance from a first step, and a second predetermined distance related to a thickness of the first end intermediate a second step and the toe;

applying brakes on a vehicle having a brake shoe table connected to at least one brake lining which act on a brake drum;

measuring brake lining wear by inserting the first end with the brakes applied, and if the gauge passes between the brake shoe table and the brake drum along the width of the at least one brake lining along the first step, indicating to the user of the gauge that at least the first predetermined distance exists as a thickness of the at least one brake lining, and if the gauge passes between the brake shoe table and the brake drum along the width of the at least one brake lining along the first second step, indicating to the user of the gauge that at least the second predetermined distance exists as a thickness of the at least one brake lining, and if the gauge sticks or does not pass between the brake shoe table and the brake drum along the width of the at least one brake lining, indicating to the user of the gauge that the first predetermined distance does not exist as a thickness of the at least one brake lining; and wherein the first end further comprises a recess intermediate the first end and the shank, said recess having an interior surface spaced from the toe by a predetermined recess distance; and further comprising measuring brake drum wear by performing the steps of inserting the recess over a ridge of the brake drum; and with the toe contacting the brake drum where the lining contacts the brake drum when the brakes are applied, examining to see if the interior surface of the recess contacts the ridge, if the ridge contacts the interior surface then indicating that brake drum wear exceeds a maximum allowable wear, but if the ridge does not contact the interior surface of the recess, then indicating that brake drum wear does not exceed the maximum allowable wear.

16. The method of claim 15 further comprising a plurality of feet extending along a plane containing the toe, and during the step of measuring brake lining thickness, inserting the first end with one of the toe of the gauge against the brake shoe table with the brakes applied and inserting the toe of the gauge against the brake drum with the brakes applied.

17. The method of claim 15 further comprising the step of providing first and second indicia at the first end of the gauge, said first indicia proximate to the first step and second indicia proximate to the second step, wherein the appropriate of the first and second indicia provides an indication of the brake thickness measured.

* * * * *